Nov. 4, 1930.  W. F. CHADBOURNE  1,780,169

SNAP-ON CLIP

Filed May 14, 1928

INVENTOR
Werden F. Chadbourne
by H. W. Kenway. Atty.

Patented Nov. 4, 1930

1,780,169

UNITED STATES PATENT OFFICE

WESTON F. CHADBOURNE, OF FRANKLIN, MASSACHUSETTS

SNAP-ON CLIP

Application filed May 14, 1928. Serial No. 277,549.

This invention relates to tire chains and particularly to an improved means for detachably connecting the cross chain hooks with the links of the side chains.

It was formerly the practice to close the hook of a cross chain upon one strand of a side chain link, making a permanent connection which could be disengaged only by opening the hook. This could not be done satisfactorily except with proper tools and if a break in a cross chain occurred on the road, the driver of the car was obliged either to take the whole chain off or drive with a broken cross chain striking the mud-guards of the machine or other projecting parts.

In one of its aspects, the present invention consists in a spring clip of novel construction which can be used in providing a detachable connection between the side chains and cross chains having open hooks. Snap-on clips have been used heretofore which have been placed upon the hooks themselves. As distinguished from such a construction, the present invention contemplates a clip so constructed that it may be attached to and carried by the side chain link to which the hook is connected. As herein shown, the clip is constructed to be attached to one strand of the side chain link and to bear against the curved end of the cross chain hook, maintaining it at all times in yielding engagement with the other strand of the side chain link. There are numerous advantages in a clip of this construction. In the first place, it may remain always upon the side chain and serves to detachably retain any cross chain which it may be desired to connect. It may be used in connection with chains of all commercial types, including those having rubber or composition cross members.

As herein shown, the clip is shaped at one edge to engage one strand of the side chain link and has a yieldable loop merging into a curved end which engages the end of the cross chain hook. The clip is thus shaped so that the hook is urged at all times into a position in which its inner curved part which is adjacent to its root, and which is consequently the strongest part of the hook, pulls on the side link strand. The hook engaging portion of the clip is spaced from the opposite strand of the link sufficiently to admit the end of the hook between itself and the strand of the link when a connection is to be made, so that the cross chain may be placed by merely entering the end of the hook and then pulling it down. Further, the flexible loop of the clip permits the hook engaging portion to twist angularly to accommodate displacement of the cross chain in either direction according as the motor vehicle is in advance or reverse. On the same account, the clip may also conform itself to the cross chain hook if the latter becomes twisted or bent in use. Still another advantage of the clip constructed and assembled in accordance with my invention is that it is undisturbed by excessive strain on the cross chain. In fact, the greater the strain upon the cross chain the less is the strain to which the clip itself is subjected.

These and other features of the invention will be best understood and appreciated from the following description of a preferred embodiment thereof, selected for purposes of illustration and shown in the accompanying drawings, in which Fig. 1 is a view in elevation of a portion of a side chain and cross chain assembled with the clip of my invention;

Figures 2, 3:
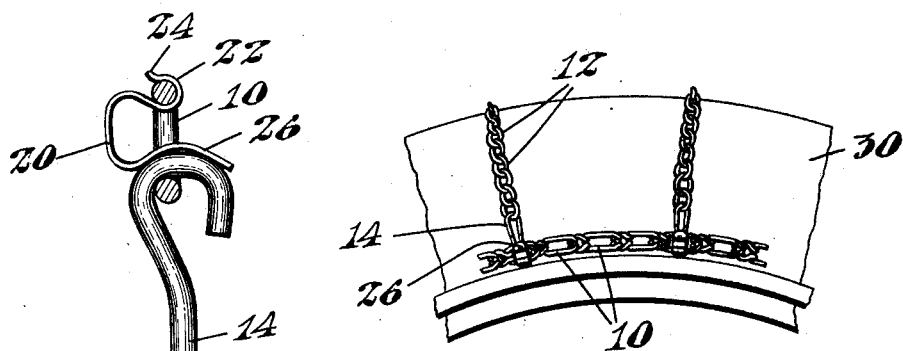
Fig. 2 is a view in end elevation, partly in section.
Fig. 3 is a view in side elevation, on a reduced scale, showing the chain as applied to a tire.

The side chain is composed of connected links 10 having parallel side strands and with the end of each strand twisted into connection with the preceding link. Each cross chain is made up of a number of intermediate links 12 with a double strand hook 14 at each end. The bill of the cross chain hook 14 is formed by bending the ends of both strands upwardly in a curve and over the body portion of the hook and, as shown in Fig. 2, the hook is left open sufficiently to enable it to receive a strand of one of the links 10 of the side chain. The clip herein shown is bent up of spring sheet metal and comprises at one edge a rolled channel portion 22 terminating in an outwardly flared lip 24. In size the rolled channel portion of the clip is such that it may be sprung upon one strand of the side chain link. The flaring lip 24 facilitates the entrance of the strand and when once entered, the clip is yieldingly but securely attached. It is free to swing about the strand to which it is secured but can be removed only by having the loop 24 forced away from the body portion of the clip so as to open the channel. It will be seen that the channel surrounds the strand for approximately 270° so that the possibility of accidental engagement is obviated.

The channel portion 22 of the clip merges into a central loop or U-shaped portion 20 which extends below or beyond the plane of the strands of the link 10. The free side of the loop 20 is extended upwardly to form the outwardly concaved upstanding end 26. This extends through the link 10 and above the plane of its strands and out of contact with the other strand of the link by an amount sufficient to permit the end of the hook 14 to be inserted between itself and the strand of the link when it is desired to make a connection. It will be seen that when the end of the hook is thus inserted, it needs only to be pulled at right angles to the side chain in order to seat the strand of the side link fully in the bend of the hook. In this operation, the clip will adjust itself about the axis of the other strand of the link so as to bear fairly against the outer end of the hook 14. The pressure of the upstanding end 26 is then distributed in such a way upon the back of the hook as to cause the latter to be shifted upon the strand of the link 10 in such position that its inner curved part adjacent to the root of the hook, and which is consequently the strongest part of the hook, pulls upon the side link strand. The clip, therefore, insures the most advantageous relative position of the hook and the link as a connection is made. From an inspection of Fig. 3, in which the chain is shown in position upon a tire 30, it will be apparent that the hook 14 cannot be accidentally disengaged from the side link 10 to which it is connected without springing the upstanding end 26 of the clip inwardly or without swinging the hook into a position at right angles to that which it normally occupies. Accidental disengagement of the cross chain is, therefore, completely guarded against.

Figure 1:
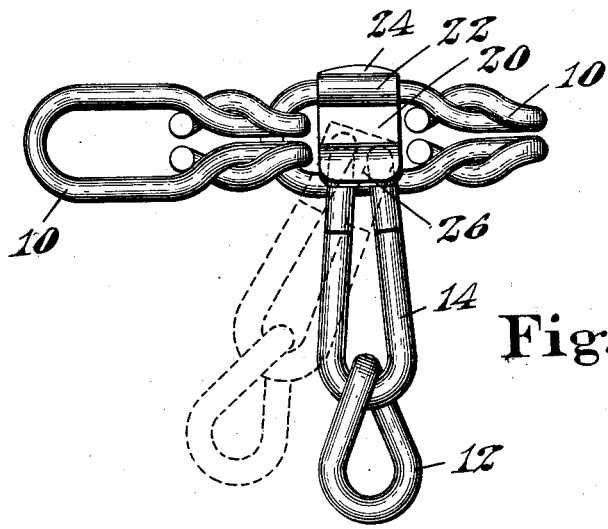

In its width, the clip corresponds substantially to the width of the double strand of the hook 14 and, as shown in Fig. 1, it normally bears evenly against the back of both strands. The cross chain is displaced angularly somewhat with respect to the side chain in accordance with the direction of movement of the vehicle. This condition is indicated by the dotted line position of the cross chain in Fig. 1. It will be noted that under these circumstances, the upstanding end 26 of the clip will twist temporarily, maintaining its engagement with both strands of the hook as the latter rocks upon one strand or the other. The clip is, therefore, thoroughly effective whether the vehicle is in advance or in reverse. Flexible U-shaped portion 20 of the clip being of substantial length permits this twisting of the end 26 without liability of breakage. On the same account, the clip will also conform itself to the cross chain hook if the latter becomes bent in use so that the two strands are unsymmetrical in contour.

The mounting of the clip upon one strand of the side chain and its location between the two strands protects the clip particularly well from damage in use. It will be observed also that in case of any excessive strain upon the cross chain, even to the extent of deforming the strand of the side chain, there will be no strain whatever transmitted to the clip itself, while any movement of the hook 14 which does affect the clip tends to make it grip more tightly the strand to which it is connected.

It will be noted also that in case the cross chain breaks, so that its end is free to swing outwardly, it will be retained in place only by the frictional engagement of the clip. This is extremely advantageous as the loose end will, consequently, disengage itself and drop out of the chain without striking the mudguard.

Figures 4, 5:
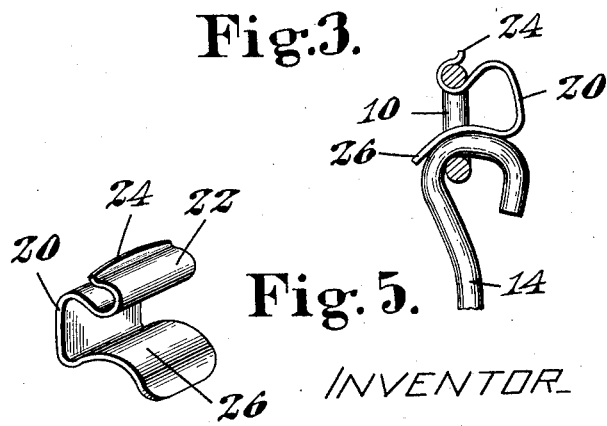
Fig. 4 is a view in perspective of the clip.
Fig. 5 is similar to Fig. 2 with the clip reversed.

As will be apparent, the clip may be attached to the side chain link in either position, that is to say, with its free end 26 directed toward the open side of the hook, as shown in Fig. 2, or with its free end directed toward the back of the hook, as in Fig. 5. In both positions of the clip, the retaining action of the clip is the same and the cross chain may be attached and detached with equal convenience.

Having thus described my invention, what I claim as new and desire to secure by Letters Patent is:

1. In a tire chain, a spring clip having a U-shaped yieldable body terminating at one side in a rolled yielding channel for detachably engaging one strand of a side link and at the other in a curved outwardly concaved flange for engaging the curved outer end of a cross chain hook.

2. In a tire chain comprising side and cross chains, a spring clip having a portion shaped for attachment to one side strand of a side chain link and another portion shaped to maintain a continuous yielding pressure on a cross chain hook connected to the other side strand of the same link.

3. In a tire chain comprising side and cross chains, a U-shaped spring clip having one leg portion shaped for attachment to one side strand of a side chain link and the other leg portion being spaced therefrom and shaped to engage and bear resiliently against the outer face of a cross chain hook in a manner to keep the hook engaged.

4. In a tire chain comprising side and cross chains, a U-shaped spring clip having one leg portion shaped for pivotal engagement with one strand of a side chain link, the other leg portion being spaced from the first portion and curved to provide an outer concave face, and the intermediate connecting portion being a resilient loop permitting springing of the leg portions toward each other.

5. In a tire chain comprising side and cross chains, a U-shaped spring clip having a U-shaped connecting portion intermediate two leg portions, the leg portions being spaced apart and curved in opposite directions to provide outer concave link engaging faces thereon between the ends of the leg portions and their connecting portion.

6. In a tire chain comprising side and cross chains, a U-shaped spring clip having a curved connecting portion intermediate two leg portions, one leg portion being shaped for attachment to one side strand of a side chain link and the other leg portion being spaced therefrom and longer and curved inwardly to provide an outer link engaging concave face thereon between its end and the connecting portion.

7. In a tire chain comprising side and cross chains, a clip having one leg portion bent outwardly upon itself to provide a hook-like end adapted to snap into resilient holding engagement over one strand of a side chain link, a yielding intermediate U-shaped portion, and a second leg portion opposite and spaced from the first leg portion.

WESTON F. CHADBOURNE.